United States Patent [19]

Kharagezov et al.

[11] 4,154,287
[45] May 15, 1979

[54] APPARATUS FOR MANUFACTURING FUSIBLE PATTERNS

[75] Inventors: Yakov A. Kharagezov; Viktor A. Junichenko; Vitaly S. Poluboyarov; Jury L. Perevozkin; Jury A. Gajun; Anatoly A. Mkrtychian; Stalina P. Kotenko, all of Rostov-na-Donu, U.S.S.R.

[73] Assignee: Rostovsky-na-Donu-Nauchno-Issledovatelsky Institut Tekhnologii Mashinostroenia, Rostov-na-Donu, U.S.S.R.

[21] Appl. No.: 858,184

[22] Filed: Dec. 7, 1977

[51] Int. Cl.$^2$ .............................................. B29F 1/08
[52] U.S. Cl. .................................. 164/160; 425/551; 425/585
[58] Field of Search ...................... 164/7, 45, 159, 160; 425/547, 544, 546, 551, 557, 561, 585; 264/329

[56] References Cited
U.S. PATENT DOCUMENTS

| 2,359,840 | 10/1944 | Goessling | 264/329 X |
| 2,514,884 | 7/1950 | Maynard | 425/547 X |

Primary Examiner—Robert D. Baldwin
Attorney, Agent, or Firm—Burgess, Ryan and Wayne

[57] ABSTRACT

The present invention relates to equipment used for investment casting and may find application in various fields of engineering to enable automation of the process of manufacturing easily fusible patterns.

The proposed apparatus comprises a pressure casting die formed of two parts, one of which is mounted for reciprocated movement in the horizontal, an injection means formed of a heated body with a chamber to receive a pattern material, an air cylinder with a hollow piston and a hollow rod, a means for evacuating the chamber and the pressure casting die cavity after introducing a pattern material therein, and a means for supplying a fluid to the pressure casting die upon evacuation of the latter, said fluid supply means comprising a moving element fitted with a channel adapted to intermittently communicate a fluid source with the pressure casting die cavity.

The apparatus also incorporates a heated receptacle for a pattern material, intermittently communicating with the chamber of the injection means, and an intermediate means formed with a horizontally extending channel accommodating the moving element.

Such structural arrangement makes it possible to enhance efficiency of the proposed apparatus, obtain distinct imprint of the pressure casting die surface, and reduce pattern cooling time.

5 Claims, 12 Drawing Figures

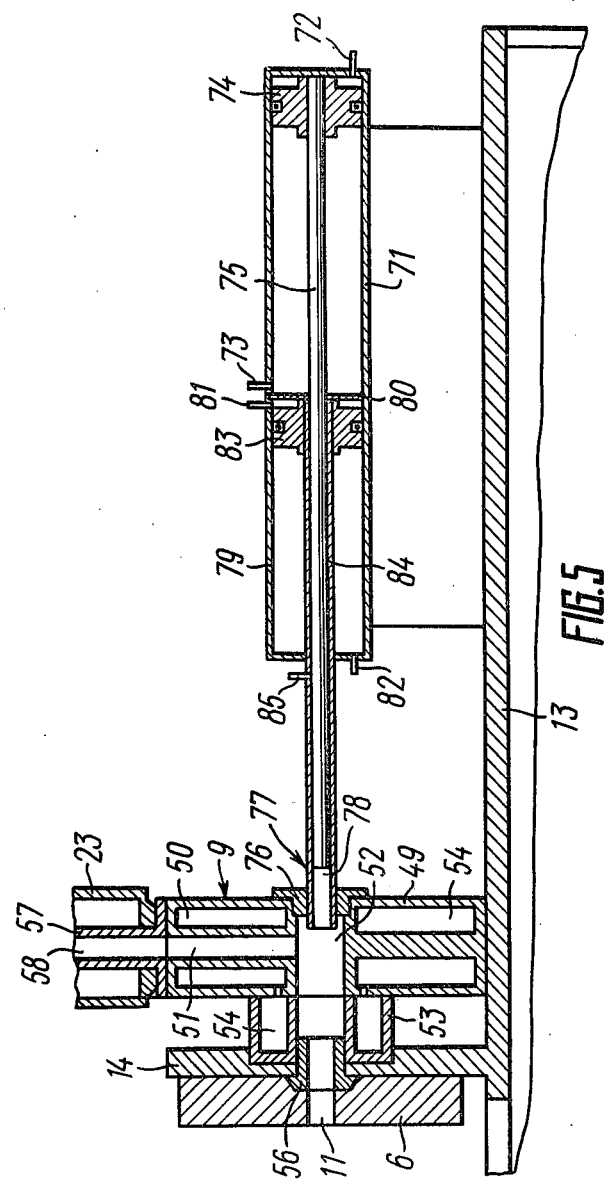

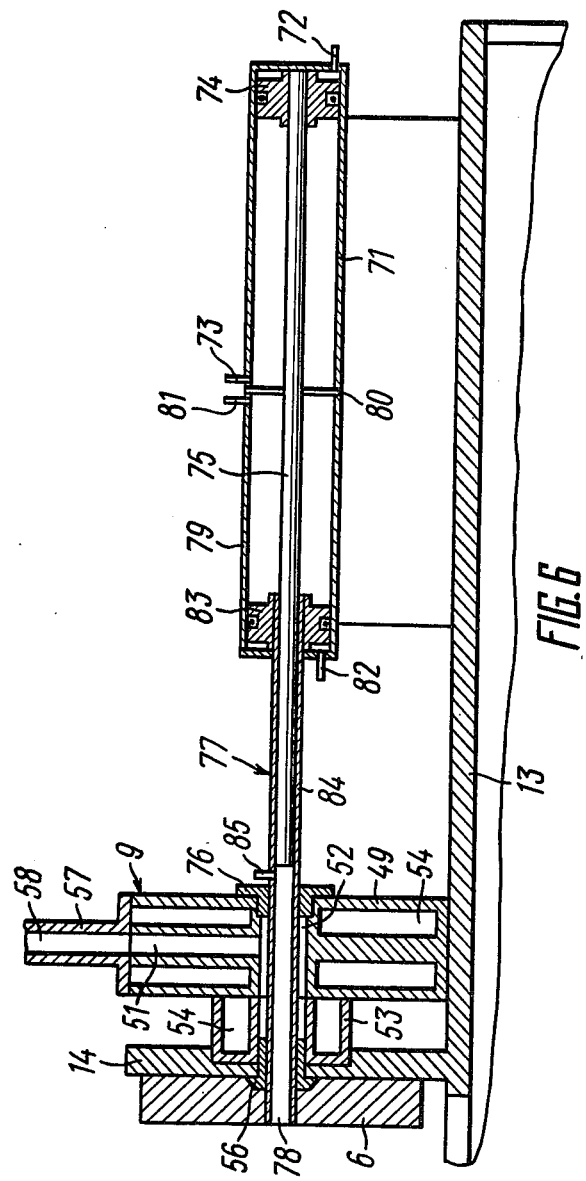

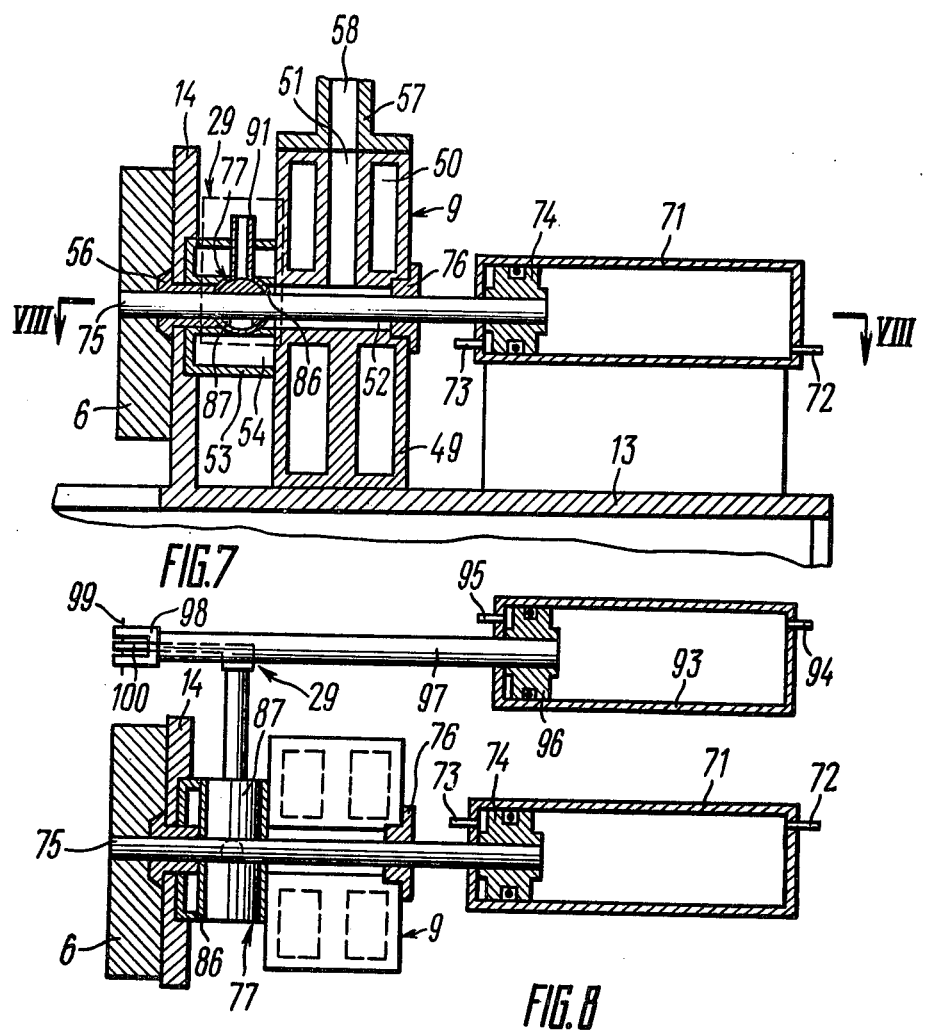

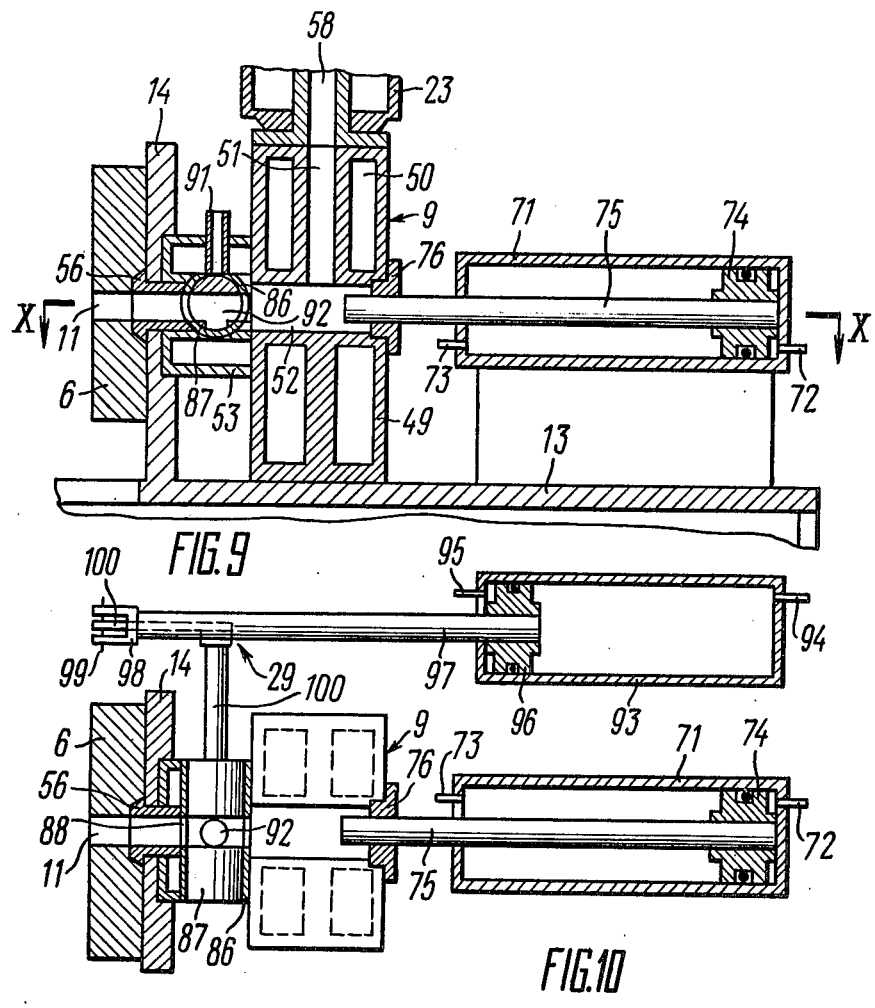

APPARATUS FOR MANUFACTURING FUSIBLE PATTERNS

BACKGROUND OF THE INVENTION

1. Field of the Invention

The present invention is concerned with equipment for investment casting, and more particularly with apparatus for manufacturing easily fusible patterns. The invention is readily adaptable for application in various fields of engineering to enable automatic performance in the process of manufacturing easily fusible patterns for use in the production of precision-investment castings.

This invention can be advantageously utilized in foundry shops dealing with investment casting where quantity production of high-quality patterns is required.

2. Description of the Prior Art

It is modern practice to manufacture easily fusible patterns for metal castings from wax-type patterns materials.

The patterns are made by pressing-in said materials into a pressure casting die either in liquid state or by preliminarily transforming these materials into pasty state by injecting therein 15 to 20 percent of air.

In the process of injection of this liquid wax-like material into a pressure casting die, the latter should be kept under pressure until complete cooling of the pattern so as to prevent the formation of shrinkage cavities on the pattern surface. This, however, impairs the production efficiency of pattern making apparatus.

In addition, the resultant ceramic shell mould is subjected to considerable strains in the process of the pattern fusion due to appreciable thermal expansion of the pattern material. When thus effected by overdue strains, the mould tends to form cracks which may even cause its destruction, necessitating therefore higher consumption of additional materials and impairing quality of finished castings.

To make up for the pressure of the expanding pattern acting on the mould, the patterns are melted in steam autoclave plants under pressure of 5 to 6 atm. This, however, requires expensive and cumbersome equipment.

When making patterns by injection of pattern material into a pressure casting die, the air contained therein is compressed. Upon withdrawal of the pattern from the pressure casting die the air, tending to expand, causes either deformation or destruction of the pattern. To prevent this undesirable effect, it is necessary to increase the pattern hold-down time in the pressure casting die, which entails lower rates of production.

Moreover, the difficulty to maintain a constant amount of air in the pattern material, which air serves to adjust pressure difference in the mould, may result in the formation of cracks in the latter.

There are known in the art apparatus for manufacturing easily fisible patterns (cf. USSR Inventor's Certificate No. 337,184, cl. 22 7/02).

The apparatus of the Inventor's Certificate referred to above comprises a bed with a frame rigidly secured thereupon and carrying a pressure casting die composed of two parts, one of which is fixed on the frame and the other one is mounted for reciprocated movement in the horizontal, an injection means, a means for purging the pressure casting die inlet channel, a water tank, a heated receptacle for a pattern material, a pipeline system for delivery of pattern material to the injection means, and a common control system incorporating electric and pneumatic means adapted to enable automatic performance of the production process and re-cycling.

The injection means is formed of a heated body with a chamber for pattern material, intermittently communicating with the heated receptacle and with the pressure casting die cavity through horizontal and vertical channels of the intermediate means, said injection means also comprising an air cylinder with a hollow piston rigidly connected through its rod with the chamber and an injection mechanism arranged in the hollow rod and in the chamber.

The means for purging the inlet channel of the pressure casting die is provided with a needle fitted so as to be introduced into the channel of the pressure casting die through the horizontal channel of the intermediate means.

With the aforedescribed apparatus it is impossible to enhance the production efficiency, and the produced patterns fail to insure the production of high-quality moulds free from defects by reason of three-stage injection operation during which the pattern material undergoes injection accompanied by steadily mounting pressure in the cavity of the pressure casting die.

The first stage of the injection operation is effected at the expense of pressure required for forced supply of the pattern material to the chamber of the injection means.

The second stage of injection is carried out by the principal injection mechanism, and, finally, the third stage is performed by the needle of the means for cleaning the inlet channel of the pressure casting die, actuated on completion of the injection operation. As the needle advances into said channel, it pushes forward a batch of pattern material disposed in the gate channels of the pressure casting die, thereby increasing pressure in the latter.

It is therefore an object of the present invention to obviate the above disadvantages.

The primary object of the invention is to improve quality of the patterns being produced and enhance production efficiency of an apparatus.

Another object of the invention is to provide an apparatus for manufacturing fusible patterns wherein the supply of pattern material to a pressure casting die will be effected so as to preclude steadily mounting pressure of the pattern material in the pressure casting die.

Still another object of the invention is to provide an apparatus for manufacturing fusible patterns, which will enable the production of patterns having distinct imprint of the pressure casting die cavity.

Yet another object of the invention is to step up the process of cooling the produced patterns as well as to diminish thermal expansion thereof caused by heating during melting process.

SUMMARY OF THE INVENTION

These and other objects and features of the invention are accomplished by the provision of an apparatus for manufacturing fusible patterns, comprising a bed with a frame carrying a pressure casting die formed of two parts interconnected through and operated by a common automatic control system, one of which die parts is fixed on the frame and the other one is mounted for reciprocated movement in the horizontal; an injection means formed of a heated body with a chamber for a pattern material, periodically brought in communication with a heated receptacle for the pattern material and with the pressure casting die cavity through horizontal and vertical channels of an intermediate means, said injection means also incorporating an air cylinder with a hollow rod, rigidly connected with the chamber, and a piston, as well as an injection mechanism accommodated in the hollow piston and in the chamber; a means for purging an inlet channel of the pressure casting die, fitted with a needle fixed so as to be readily introduced into the pressure casting die channel of the intermediate means, according to the invention, the injection means incorporates a means for evacuating the chamber and cavity of the pressure casting die after feeding therein pattern material, the latter means being kinematically linked with the hollow piston of the air cylinder; and a means for supplying a fluid to the pressure casting die upon evacuation of the latter, said means incorporating a moving element accommodated in the horizontal channel of the intermediate means and formed with a channel adapted to periodically communicate the cavity of the pressure casting die with a fluid supply source.

Such constructional arrangement of the proposed apparatus enables the filling of a pressure casting die with pattern material to be carried out in the process of a single stroke of an injection means.

The provision in the injection means of a means for evacuating the chamber and the pressure casting die cavity after feeding therein pattern material enables, upon freezing of the pattern surface layer in direct contact with the pressure casting die surface, the removal of the residual infreezed pattern material from the inlet channel of the pressure casting die as well as from the pattern cavity. This permits of producing hollow which makes it possible to decrease the patterns time of holding patterns in a pressure casting die and thereby enhance the apparatus production efficiency. In addition, the penetration of the residual pattern material to the cavity of the pressure casting die through its inlet channel is ruled out when a needle is introduced therein for the purpose of its cleaning.

The provision of a means for feeding a fluid to a pressure casting die upon evacuation of the latter enables the voids formed in a pattern to be filled under the action of the fluid pressure, which gives distinct imprint of the pressure casting die cavity, steps up the pattern freezing and improves quality of the latter.

As a result, the patterns produced on such an apparatus are made hollow and therefore become far less susceptible to thermal expansion during heating in the process of melting, exerting pressure on the shell mould within the limit of its endurance.

The invention is likewise characterized by that a means for evacuating the pressure casting die cavity and its chamber is formed of an air cylinder having its body rigidly affixed on the air cylinder body of an injection means, the rod of the former cylinder being in permanent contact with a hollow plunger of the injection means air cylinder.

Thus it becomes possible to carry on the apparatus operation in such a manner that by supplying compressed air required for evacuation as the injection means is concurrently returned to its initial position, the chamber for pattern material is retained in its lower position while the plunger of the pressing mechanism unhinderedly returns to its initial position. The pattern material is prevented from passing to the chamber, with decompression zone being formed below the injection plunger of the pressing mechanism, enabling the latter to function in a manner similar to that of the pump input piston.

It is expedient that the means for feeding a fluid to the pressure coating die be formed of an air cylinder mounted on the means for cleaning the inlet channel of the pressure casting die and having an open-ended rod which is a moving element of said means, provided with a nipple brought in communication with a fluid supply source, said rod accommodating in its interior a needle of the means for cleaning the pressure casting die inlet channel.

However, the means for feeding a fluid to the pressure casting die may be formed with a sleeve mounted in the intermediate means perpendicular to its horizontally extending channel and fitted with three holes, of which two holes are coaxial with the horizontal channel of the intermediate means and the third hole receives therein the sleeve in communication with a fluid supply source, said sleeve accommodating a moving element in the form of a sliding spool provided with a drive for its turning as well as with T-channel adapted to communicate the cavity of the pressure casting die either with the nipple or with the horizontal channel.

Another important feature of the invention resides in that mounted vertically in the interspace between the intermediate means and the chamber is a branch pipe permanently communicating with the vertical channel of the intermediate means and having its top end plugged and disposed in the chamber, said branch pipe being formed with a transverse channel extending through its interior in the proximity of the plugged end thereof to thereby enable periodical communication with the chamber during its movement.

DESCRIPTION OF THE DRAWINGS

A fuller understanding of the nature and objects of the invention will be had from the following description in which the preferred embodiment is set forth in detail in conjunction with the accompanying drawings, in which:

FIG. 5 is a view of FIG. 4 showing the moment of injection of the pattern pasty material into the pressure casting die cavity, as well as the sucking-out of the unfreezed residual material from the pattern interior cavities;

FIG. 6 is a view of FIG. 4, shown at the moment of feeding a fluid to the pattern interior cavities;

FIG. 7 is a longitudinal sectional view of a means for cleaning the inlet channel of a pressure casting die;

FIG. 8 is a cross-sectional taken along line VIII—VII of FIG. 7;

FIG. 9 is the view of FIG. 7, showing the moment of injection of pattern material into the pressure casting die cavity and the sucking-out of the residual pasty pattern material from the pattern interior cavities;

FIG. 10 is a cross-section taken along line X—X of FIG. 9;

DESCRIPTION OF THE PREFERRED EMBODIMENT

Figure 1:
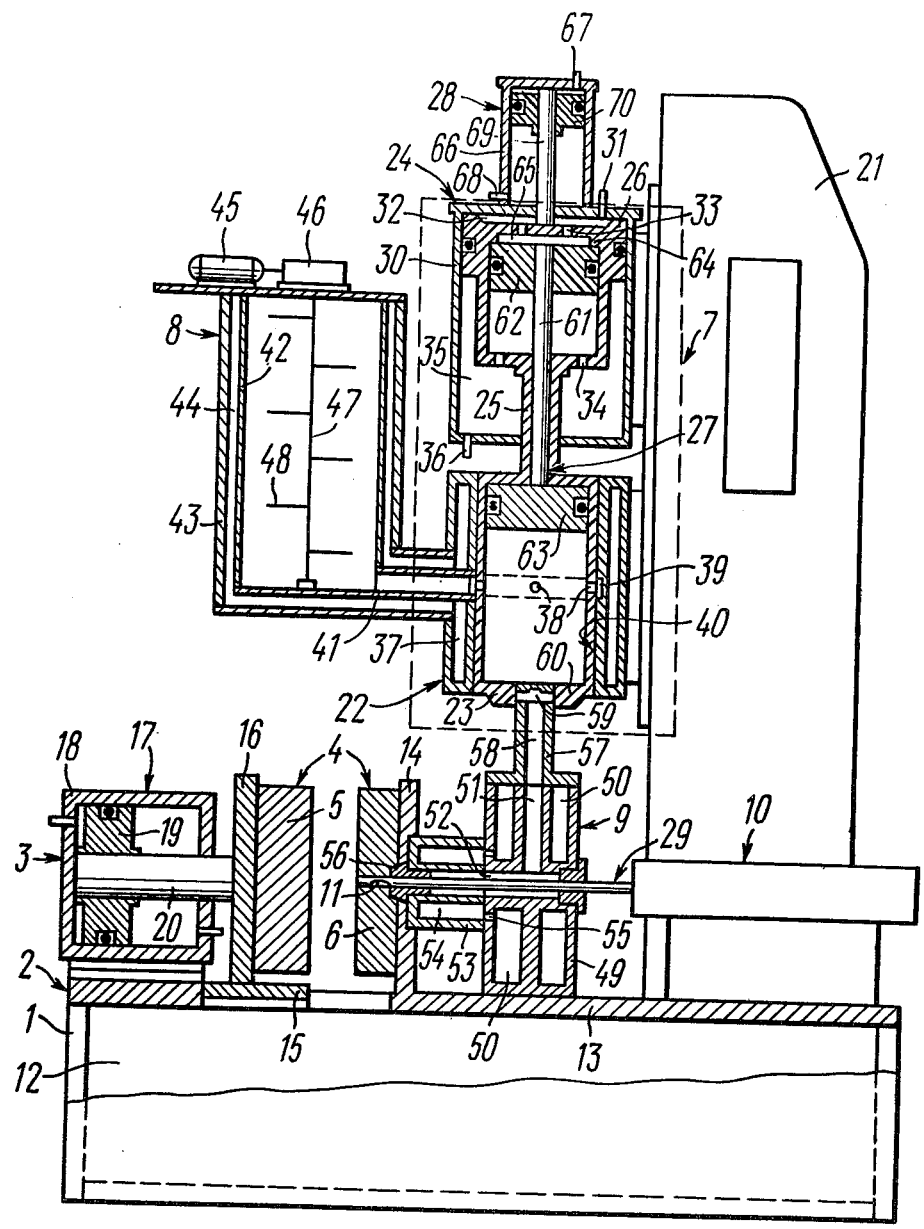
FIG. 1 is a partial, longitudinal sectional view of an apparatus for manufacturing fusible patterns according to the invention.

In the embodiment, an apparatus for manufacturing fusible patterns consists of a bed 1 (FIGS. 1, 2 and 3) whereupon is rigidly secured a frame 2 mounting an appliance 3 for arranging a pressure casting die 4 which is split in the vertical and formed of two parts 5 and 6, an injection means 7, a heated receptacle 8 for pattern material such as paste, an intermediate means 9, a means 10 for cleaning an inlet channel 11 (see FIGS. 2 and 3) of the pressure casting die 4, a water tank 12 positioned under the frame 2 and intended for cooling the patterns obtained in the pressure casting die 4 and dropped thereout on its opening.

The frame 2 is essentially a plate 13 secured on the bed 1 and formed with a vertically extending rib member 14 made integrally therewith, as well as with a guide 15.

The appliance 3 for arranging the pressure casting die 4 includes a base plate 16 placed in the guides 15, and an actuator 17 for opening and closing the pressure casting die 4, said actuator being essentially a power cylinder having its body 18 mounted on the frame 2 and provided with a piston 19 and a rod 20. The cylinder body 18 is arranged so that its longitudinal axis is normal to the joint face of the pressure casting die 4. The piston rod 20 has fixed on its free end the base plate 16 which is actuated by the power cylinder for reciprocated movement in the horizontal along the guides 15.

Rigidly fixed on the base plate 16 is the part 5 of the pressure casting die 4, enabled to move reciprocatingly together with said plate in the horizontal direction. The part 6 of the pressure casting die 4 is secured on the rib 14 of the frame 2 and remains stationary during the operating process. The pressure casting die parts 5 and 6 have cavities (not shown), each of which conform to the shape of the corresponding part of the pattern being produced. Extending from each of said cavities in the direction of the longitudinal axis of the pressure casting die 4 are gate channels (not shown), which are in communication with the inlet channel 11 fitted in the fixed part die 6.

The injection means 7 is adapted to feed pattern material to the pressure casting die 4 and is secured on a stand 21 of the bed 1. The injection means 7 is formed of a heated body 22 with a chamber 23 for pattern material, and incorporates an air cylinder 24 having a hollow rod 25 and a hollow piston 26, as well as an injection mechanism 27. According to the invention, the injection means 7 also comprises a means 28 for evacuating the chamber 23 and the inner space of the pressure casting die 4 after feeding pattern material thereinto, and a means 29 for supplying a fluid, such as compressed air, to the pressure casting die 4 on evacuation of the latter.

Figure 2:
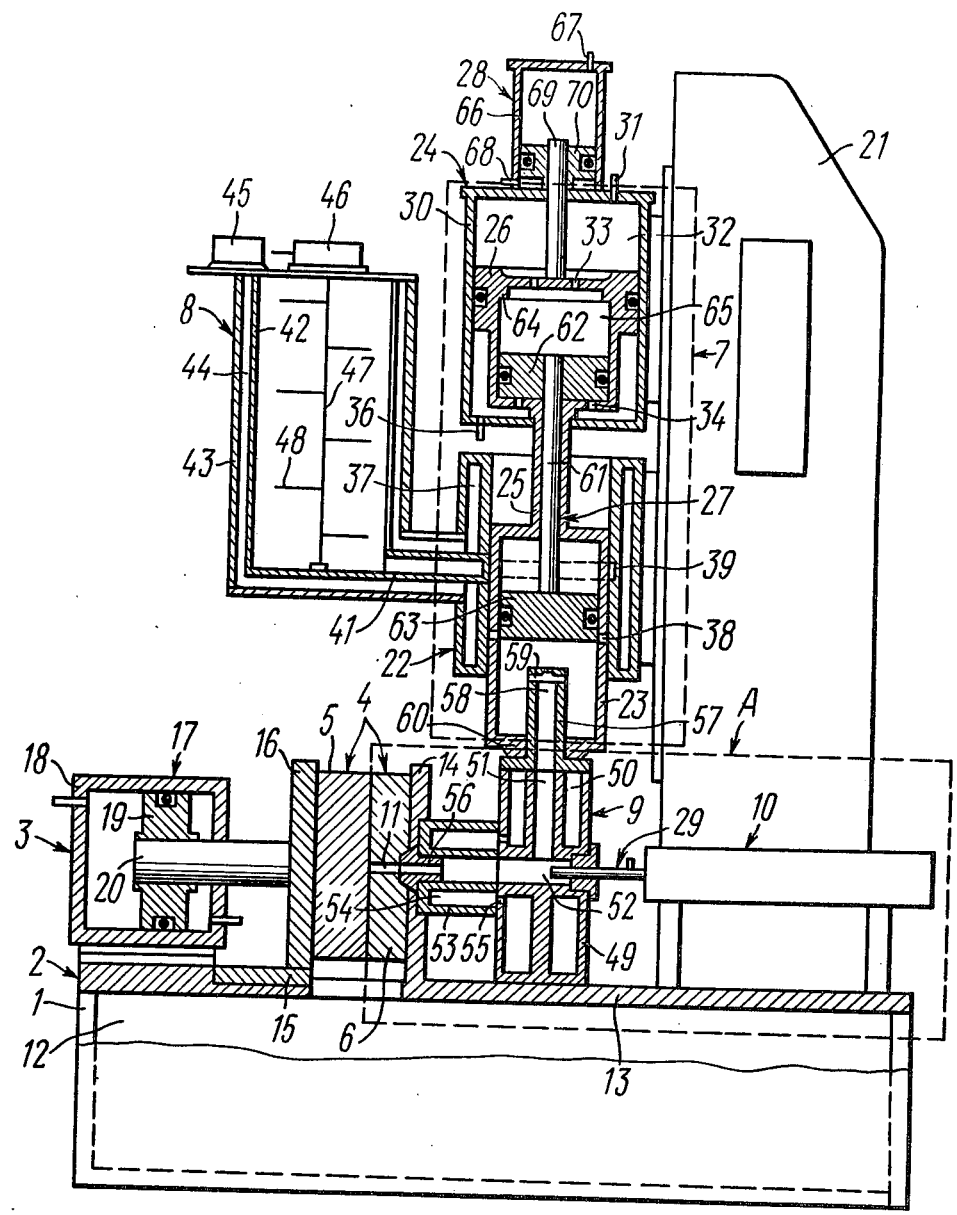
FIG. 2 is a view of the apparatus shown in FIG. at the moment of injection of pattern material into the pressure casting die cavity.
Figure 3:
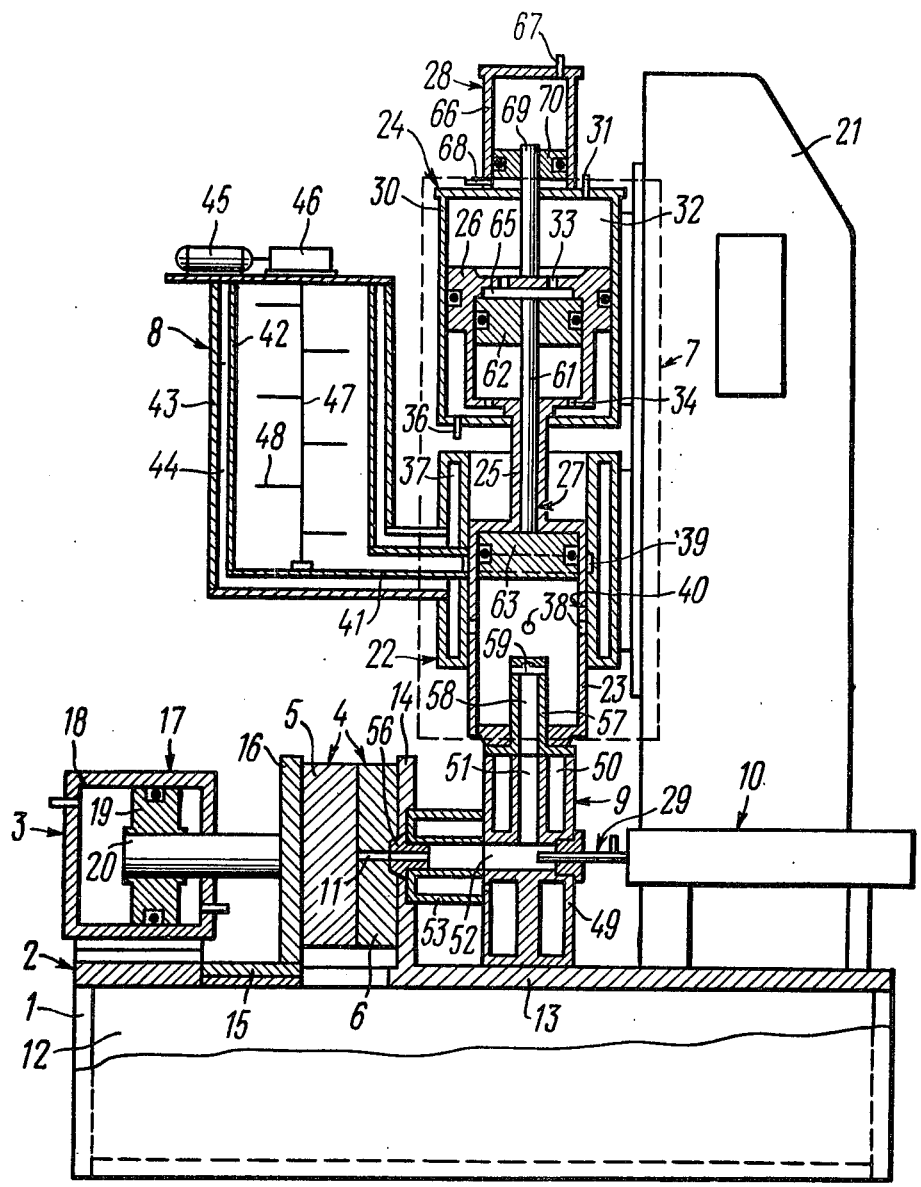
FIG. 3 is a view of the apparatus shown in FIG. 1 at the moment of sucking out the residual unfreezed pattern material from the pattern cavities.

The air cylinder 24 has a body 30 affixed on the stand 21. The hollow piston such as shown at 26 in FIGS. 1, 2 and 3, is made integral with the hollow rod 25 extending through an opening fitted in the body 30 and having secured on its free end the chamber 23 which can be made integrally therewith such as shown in FIGS. 1, 2 and 3. Provided at the upper end part of the body 30 is a nipple 31 which is brought in communication by conventional means with an air supply source (not shown), and with a cavity 32 formed by a recess made in the piston 26, such as shown in FIGS. 1, 2 and 3.

The piston 26 is formed with holes 33 adapted to communicate the above-piston space 32 with the chamber of the piston 26, and openings 34 adapted to communicate the chamber of the piston 26 with the under-piston space 35. Provided in the lowe end of the body 30 is a branch pipe 36 through which compressed air is released from the space 35.

The heated cylindrical body 22 is secured to the stand 21 and has an annular inner space 37 intended for the circulation of a heated liquid, such as water. The inner space 37 is connected by conventional means through a system of pipelines (not shown) with a pumping station as well as with a container filled with water having a temperature prescribed by the process (not shown).

The body 22 accommodates the chamber 23 adapted to receive pattern material. Since the chamber 23 is made integral with the rod 25, the reciprocated motion of the piston 26 is therefore imparted to the chamber 23 during its travelling in the body 22. The chamber 23 periodically communicates with the cavity of the pressure casting die 4 through the intermediate means 9, and with the heated receptacle 8 through the openings 38 fitted in the side walls of the chamber 23, and through an annular recess 39 provided on the interior side wall surface 40 of the body 22 mating with the chamber 23, and through a pipe 41 adapted to communicate the heated receptacle 8 with the annular recess 39. To enable periodical communication, all the openings 38 fitted in the chamber wall are disposed at the same level, the annular recess 39 extending over the height of the body 22 so that the openings 38 of the chamber 23 are brought in coincidence with the recess 39 during upper position of the piston 26, such as shown in FIG. 1.

The heated receptacle 8 is formed of two coaxially arranged cylindrical bodies 42 and 43 defining a space intended for the circulation of a heating liquid. Mounted in the centre of the receptacle 8 is, driven by an electric motor 45 through a reducer 46, a shaft 47 formed with blades 48 intended for stirring the pattern material in the receptacle.

The intermediate means 9 is mounted on the frame 2 under the chamber 23 and is adapted to deliver pattern material from the chamber 23 to the pressure casting die cavity. The intermediate means 9 comprises a body 49 having inner spaces 50 for a heating liquid and formed with channels 51 and 52, as well as a sleeve 53 arranged intermediate the body 49 and the pressure casting die 4 and having inner spaces 54 which communicate through openings 55 with the inner spaces 50 of the body 49.

The channel 52 of the body 49 extends horizontally and communicates with the pressure casting die inlet channel 11 through the sleeve 53 built into the rib 14 and fitted with an opening which receives an inlet sleeve 56 arranged coaxially with the channel 52 of the body 49 and with the channel 11 provided in the fixed die 6.

The channel 51 of the body 49 extends vertically, intersecting the channel 52 and periodically communicating with the chamber 23 through a vertically extending branch pipe 57 which is mounted on the body 49 and whose inner space 58 continuously communicates with the vertical channel 51 of the intermediate means 9. The vertically extending branch pipe 57 has its top end plugged, such as shown in FIGS. 1, 2 and 3, having disposed in the proximity thereof a transverse channel 59 which intersects with the inner space 58 of said branch pipe. The plugged end of said branch pipe extends into the chamber 23 through an opening provided in a lower end face 60 thereof. The piston 26 being in its upper position, the chamber 23 will occupy a position such as shown in FIG. 1, in which the top plugged end of the branch pipe 57 is found at the level of the end face 60 of the chamber 23, the transverse channel 59 being overlapped by the body of the end face. When the piston 26 is displaced together with the chamber 23, the latter, travelling along the branch pipe 57, opens the channel 59, such as shown in FIG. 2, thereby enabling the chamber 23 to communicate with the pressure casting die 4 through the channel 59, the inner space 58, as well as through the channels 51, 52 and 11.

The injection mechanism 27 incorporates a rod 61 and two pistons 62 and 63 interconnected through the latter. The rod 61 is accommodated in the interior of the rod 25, the piston 62 being accommodated in the chamber of the piston 26, and the piston 63 in the chamber 23. The piston 26 serves as a body for the piston 62 and has at its surface an annular lug 64 for the piston 62 to bear up against (see FIG. 1), which makes for the information of an above-piston space 65. The chamber 23 serves as a body for the piston 63.

The means 28 for evacuating the chamber 23 and the cavity of pressure casting die 4 is kinematically linked with the hollow piston 26 of the air cylinder 24 and is formed of an air cylinder, a body 66 of which is affixed on the body 30 of the air cylinder 24 and provided with nipples 67 and 68 intended, respectively, for the supply and discharge of compressed air to from its cavities. A rod 69 of a piston 70 of this air cylinder extends beyond the body 66, enters the above-piston space 32 of the air cylinder 24 through an opening fitted in the body 30 and remains in permanent contact with its hollow piston 26 to be thereby kinematically linked therewith.

The means 10 for cleaning the inlet channel 11 of the pressure casting die 4 is arranged on the frame 2 in the proximity with the intermediate means 9 and comprises an air cylinder 71 (see FIGS. 4 through 12), which accommodates an inlet connection 72 and an outlet connection 73, through which compressed air is supplied to and discharged from its chambers, a piston 74 and a rod made in the form of a needle 75 extending beyond the body towards the intermediate means 9 through an opening fitted therein. The air cylinder is mounted so that its longitudinal axis is coincident with the longitudinal axis of the pressure casting die 4, which results in that the needle 75 is arranged coaxially with the pressure casting die channel 11. The needle 75 has such a length that during the travelling cycle of the piston 74 it is capable of entering the pressure casting die channel 11 through the horizontal channel 52 of the intermediate means 9. Accommodated in the channel 52 is a sleeve 76 which, together with the sleeve 56, serves as a guide way for the needle 75 during its movement, such as shown in FIGS. 7 through 12.

The means 29 (see FIGS. 1, 2 and 3) for feeding a fluid to the pressure casting die 4 upon evacuation of the latter comprises a moving element such as shown at 77 in FIG. 5, accommodated in the horizontal channel 52 of the intermediate means 9 and formed with a channel 78 adapted to periodically communicate a fluid supply source with the cavity of the pressure casting die 4.

Figure 4:
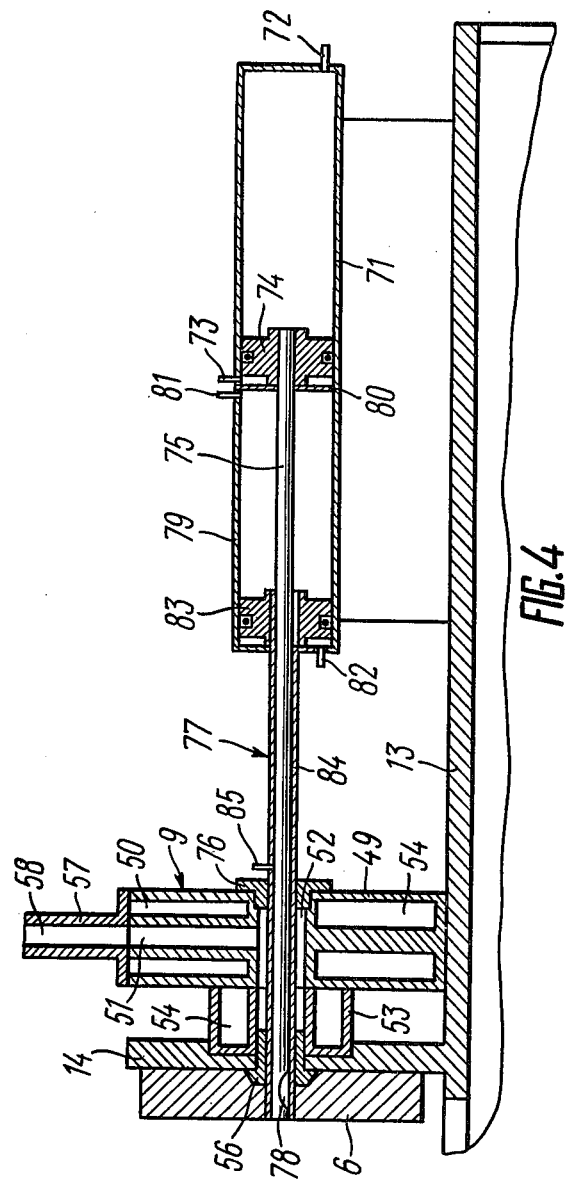
FIG. 4 is a longitudinal sectional view of unit A of FIG. 2.
Figure 11:
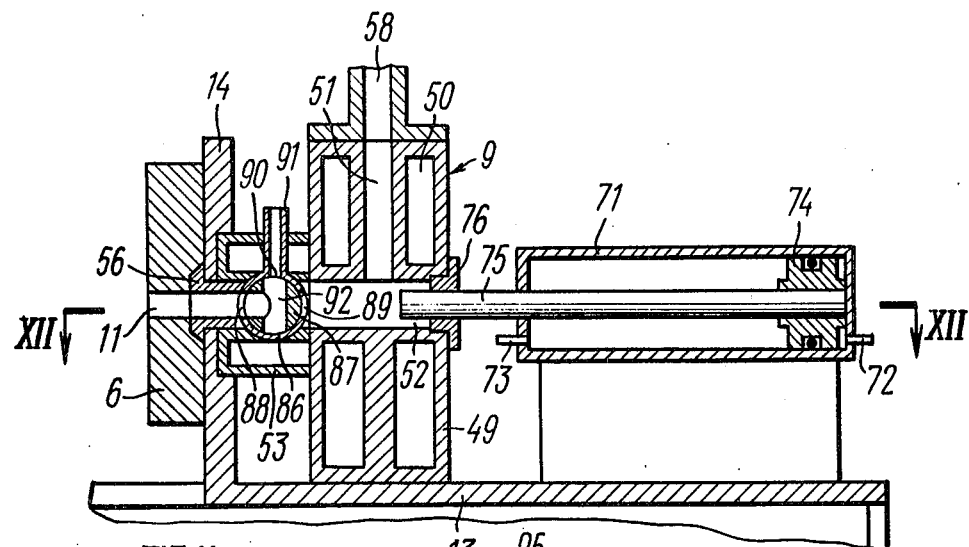
FIG. 11 is the view of FIG. 7, showing the moment of feeding a fluid to the pressure casting die.
Figure 12:
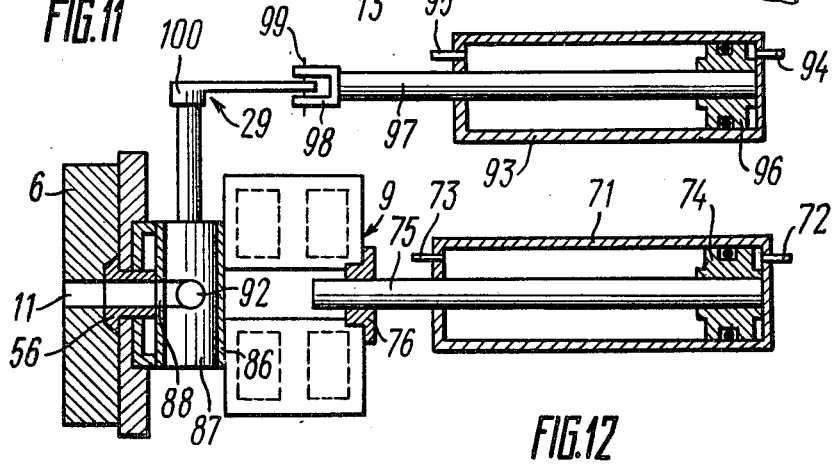
FIG. 12 is a cross-section taken along line XII—XII of FIG. 11.

The means 29, such as shown in FIGS. 4, 5 and 6, is formed of an air cylinder 79 affixed on the means 10 for cleaning the pressure casting die inlet channel, i.e. on the air cylinder 71. The air cylinder 79 is arranged coaxially with the air cylinder 71, the former and the latter being provided with a common cover 80. Accommodated in the body of the air cylinder 79 is an inlet connection 81 and an outlet connection 82 through which compressed air is fed to and discharged from its chambers, as well as a piston 82 with a through opening and a hollow rod 84 fixed in the piston and extending through its opening.

The hollow rod 84 is the open-ended moving element 77, the interior thereof serving as the channel 78. The rod 84 extends beyond the body of the air cylinder 79 through the opening fitted therein to be accommodated in the horizontal channel 52 of the intermediate means 9, the travelling length of the rod 84 being selected such that the latter is never clear of the channel 52 but occupies a position such as shown in FIG. 5. The rod 84 is provided with a nipple 85 in communication with its channel 78 and with a fluid supply source (not shown), said channel 78 accommodating the needle 75 of the means 10 for cleaning the pressure casting die channel 11. During travelling the needle 75 alternately closes and opens the nipple 85, thereby providing for periodical communication of the supply fluid source with the cavity of the pressure casting die 4.

The means 29 shown in FIGS. 7 through 10 is formed of a sleeve 86 and a sliding spool 87. The sleeve pipe 86 is stationary mounted in the sleeve 53 of the intermediate means 9 normal to its horizontal channel 52 and is fitted with three openings such as shown respectively at 88, 89 and 90 in FIG. 11, the openings 88 and 89 being coaxial with the horizontal channel 52, and the opening 90 receiving therein a nipple 91 in communication with a fluid supply source (not shown).

The sliding spool 87 is essentially the moving element 77 which is provided with an actuator for its turning and is formed with a T-channel 92 (FIG. 9), which is the channel 78. The channel 92 is adapted to communicate the cavity of the pressure casting die 4 during turning movement of the sliding spool 87 either with the nipple 91 (see FIG. 11), or with the horizontal channel 52 (see FIG. 9). Serving as the actuator of the sliding spool 87 is an air cylinder such as shown at 93 in FIG. 8, mounted on the frame. Accommodated in the body of the air cylinder 93 is an inlet connection 94 and an outlet connection 95 through which compressed air is fed to and discharged from its chambers, and a piston 96 with a rod 97 extending outside the cylinder body through an opening provided therein. Fixed on the free end of the rod 97 is a connecting link 98 which is pivotally connected by means of a pivot 99 with a bent lever 100 secured on the sliding spool 87.

It is to be understood that the proposed apparatus is provided with the required amount of conventional pneumatic and electrical devices (not shown), which makes up a control system connected by any conventional means with the hereinabove described devices to enable on-and-off switching of the latter, as well as providing for complete operating cycle and re-cycling upon removal of a pattern from the pressure casting die 4.

Prior to operation the pressure casting die 4 is open (FIG. 1), i.e. the movable die 5 is made to occupy its extreme left position as viewed in the plane of the drawing. The piston 74 (FIG. 4) together with the needle 75 also occupies extreme left position, closing the channel 11 of the pressure casting die 4, with the end face thereof being flush with the interior surface of the fixed die 6. At the same time, as regards the means 29 in accordance with the FIG. 8, the piston 96 of the air cylinder 93 also occupies extreme left position and acts through the rod 97, connecting link 98, pivot 99 and lever 100 to hold the sliding spool 87 in the position enabling the T-channel 92 thereof (FIG. 7) to communicate the inlet channel 11 of the pressure casting die 4 with the channel 52 of the intermediate means 9. This being the disposition of the openings, the needle 75 passes therethrough to close the channel 11.

The top plugged end of the branch pipe 57 (FIG. 1) is positioned flush with the end face 60 of the chamber 23, so that the channel 59 is overlapped by the body of the end face 60 and discommunicates with the chamber 23.

In the injection means 7, the piston 70 of the air cylinder of the means 28, as well as the piston 26 of the air cylinder 24 occupy uppermost position.

The piston 62 of the means 27 also occupies uppermost position, such as shown in FIG. 1. The chamber 23, fixed on the end of the rod 25, is positioned in the body 22 so that the openings 38 are coincident with the annular slot 39 provided on the interior side surface of the body 22. The pistons 63 and 62, affixed on the rod 61, occupy uppermost position to enable free passage of pattern material into the interior of the chamber 23 from the receptacle 8. The pattern material is continuously stirred in the receptacle 8 by means of the blades 48 of the shaft 47 driven by the electric motor 45 through the reducer 46. The cavity 44 of the receptacle 8, as well as the interior 37 of the body 22 and the inner spaces 50 of the body 49 of the intermediate means 9 are filled with a heating liquid.

The apparatus of the invention operates as follows.

On command from a control system, compressed air is delivered to the left chamber, as viewed in the plane of the drawing of FIG. 1, of the power cylinder or actuator 17, with the resultant right-hand displacement of the piston 19. Displaced in the same direction together with the piston 19 is the base plate 16 with the movable die 5. This movement continues until the die 5 is thrust up against the die 6, which together form the pressure casting die 4. On completion of this operation, the compressed air is delivered to the left-hand (as viewed in the plane of the drawing of FIGS. 4, 5 and 6) chamber of the air cylinder 79, and to the left-hand chamber of the air cylinder 71 to enable displacement of the pistons 83 and 74, which respectively cause the displacement of the rod 84 and the needle 75. As a result, the piston 83 and the piston 74 are displaced in the right-hand direction together with the mounted thereon rod 84 and needle 75 until they reach the point in the channel 52 at which it is connected with the channel 51 provided in the body 49 of the intermediate means 9, such as shown in FIG. 5.

As regards the means 29 such as shown in FIG. 10, the displacement of the piston 74 in the right-hand direction causes the needle 75 to leave the T-shaped channel 92 of the sliding spool 87, thus bringing in communication the pressure casting die channel 11 (FIG. 9) with the channels 51 and 52 of the intermediate means 9. As this happens, the nipple 91 is closed by the body of the sliding spool 87.

After the pressure casting die 4 (FIG. 5) is closed and the piston 84 with the needle 75 are moved away to extreme right-hand position, compressed air is delivered to the above-piston space of the air cylinder of the means 28 (FIG. 1), as well as to the above-piston space 32 through the nipple 31 and to the above-piston space 65 of the piston 62 through the openings 33 from the above-piston space 32. In view of the fact that the diameter of the piston 62 and the surface area of the end face thereof are substantially less than those of the piston 26, the force acting on the piston 26 will be substantially greater than that acting on the piston 62. As a result, the piston 26 together with the piston 70 and rod 69 of the means 28 will be first to occupy the lowermost position. The piston 26 with the rod 25 and the chamber 23 for pattern material are caused to move downward until the piston 26 is thrust up against the lower end portion of the body 30 (FIG. 2). When the chamber 23 moves downwardly, the openings 38 thereof are displaced in relation to the slot 39, thereby preventing the penetration of pattern material to the chamber 23 from the receptacle 8. During downward movement of the chamber 23, the channel 59 of the branch pipe 57 is opened to initiate the passage of pattern material into the interior of said pipe from the interior of the chamber 23.

After the piston 26 occupied its lowermost position, such as shown in FIG. 2, air pressure in the above-piston spaces 65 and 32 is equalized to cause downward movement of the piston 62 together with the rod 61 and the piston 63 fixed on the end of the latter.

With the downward movement of the piston 63, pattern material is forced out the interior of the chamber 23 to pass along the channel 59 through the branch pipe 57, and further on along the vertical channel 51 and horizontal channel 52 the pattern material enters the channel 11 of the die 6 and thence along gate channels into the cavity of the pressure casting die 4.

The injection process and, consequently, the displacement of the piston 62 continues until the pressure of pattern material in the pressure casting die 4 and that of compressed air fed through the nipple 31 are equalized. All the means and devices of the disclosed apparatus are positioned such as shown in FIG. 2. The duration of the injection process is determined experimentally by means of a timer and varies from pattern to pattern depending upon freezing time thereof until the formation of the surface skin.

Upon completion of the injection process, compressed air is delivered to the under-piston space of the body 30 through the nipple 36. In view of the fact that the piston 26 is held in lowermost position by the rod 69 of the piston 70, the compressed air, on passing through the openings 34 made in the lower end face of the piston 26, enters the interior of the latter, which is the under-piston space of the piston 62. At this time, the piston 62 together with the rod 61 and the piston 63 moves upwardly, such as shown in FIG. 3. As a result, the space under the piston 63 is decompressed to force the residual unsolidified pattern material from the pattern core, as well as from the inlet channel 11 of the pressure casting die 4, from the channels 52 and 51 of the intermediate means 9, from the inner space 58 and the channel 59 of the branch pipe 57 pass back to the chamber 23. The solidified skin of the pattern being produced may be displaced relative to the working surfaces of the pressure casting die 4. With the piston 63 reaching it uppermost position, compressed air is delivered to the under-piston space of the air cylinder of the means 28. As this happens, the piston 70, rod 69 and the piston 26 with the rod 25 and chamber 23 are returned to occupy uppermost position. The plugged end of the branch pipe 57 (FIG. 1) is positioned so as to be flush with the end face 60 of the chamber 23, thereby closing the channel 59 and preventing the pattern material from passing thereinto. The openings 38 in the chamber 23 become coincident with the annular slot 39 of the body 22, enabling pattern material to be sucked into the chamber 23. The air cylinders 71 and 79 (FIG. 4) are actuated and the rod 84 with the needle 75 are returned to extreme left-hand position, closing the inlet channel 11 of the pressure casting die 4. Thereafter, compressed air in the air cylinder 71 is caused to pass to the left-hand chamber thereof (as viewed in the plane of drawing of FIGS. 4 through 7), the piston 74 together with the needle 75 being moved to extreme right-hand position, such as shown in the drawing of FIG. 6. The needle 75 leaves the channel 78 of the rod 84 until the channel 78 is brought in communication with the nipple 85, through which is delivered a fluid, such as compressed air. Passing through the piston 84, the fluid enters the pattern interior cavity, pressing up the solidified layers of the pattern material against the working surface of the pressure casting die 4 to thereby enable distinct pattern imprint and preclude the appearance of shrinkage cavities on the surface thereof. The fluid is delivered continuously throughout the pattern solidification time.

After holding the pattern in the pressure casting die for a prescribed time period required for its solidification, the delivery of fluid through the nipple 85 is discontinued, the needle 75 is returned to its extreme left-hand position (as viewed in the drawings of FIGS. 1 and 4), and the pressure casting die is opened. To effect this, compressed air is delivered on command from a timer to the right-hand (inner space as viewed in the drawing of FIG. 1) of the power cylinder body 18. The piston 19 is returned to extreme left-hand position together with the rod 20 and base plate 16 with the movable die 5. Upon opening of the pressure casting die 4, the pattern drops out into the water tank 12 to be cooled therein.

As regards the fluid supply means 29 shown in FIGS. 7 through 9, here compressed air is delivered to the left-hand chamber (as viewed in the drawing of FIG. 8) of the air cylinder 93 instantly upon completion of the ejection operation and that of sucking out the residual unsolidified pattern material from the pattern core. On moving in the right-hand direction, the piston 96 (FIG. 12) with the rod 97, connecting link 98 and bent lever 100 causes the sliding spool 87 (FIG. 11) turn so that the latter closes the horizontal channel 52 of the intermediate means 9 whose T-shaped channel 92 brings in communication the inlet channel 11 of the pressure casting die 4 with the nipple 91, through which a fluid, such as compressed air, is delivered. Upon entering the pattern cavity, the fluid presses up the solidified layers of the pattern material against the working surface of the pressure casting die, thereby enabling distinct imprint of the pattern and precluding the appearance of shrinkage cavities on the surface thereof.

From the above it follows that the apparatus of the invention makes possible the production of hollow patterns of reduced weight due to the supply of fluid to the pattern cavities wherefrom is removed unsolidified pattern material. It is likewise possible to obtain distinct impress of the pressure casting die surface required for pattern making, and the pattern cooling time is decreased.

As a result, the production efficiency of the apparatus of the invention is enhanced and the quality of patterns being produced is improved.

What is claimed is:

1. An apparatus for manufacturing fusible patterns, comprising: a bed with a frame; a pressure casting die having a cavity and formed of two parts, one of which is fixed on the frame of said bed, the other one being mounted for reciprocated movement in the horizontal along the frame of said bed; a means adapted to effect reciprocated movement of one of the parts of said pressure casting die; an inlet channel of said pressure casting die; a heated receptacle for pattern material, mounted on said bed; an injection means mounted on said bed; an intermediate means mounted on the frame of said bed in the interspace between said injection means and pressure casting die; a horizontal channel of the intermediate means, communicating with said inlet channel of the pressure casting die; a vertical channel of said intermediate means, communicating with said horizontal channel; a heated body of said injection means; a chamber for pattern material of said injection means, mounted within said heated body for reciprocated movement and periodically communicating with said heated receptacle for pattern material and with the cavity of said pressure casting die through said vertical and horizontal channels; an air cylinder of said injection means, having a hollow piston and a hollow rod rigidly connected with said chamber for pattern material and adapted to impart reciprocated motion to said chamber; an injection mechanism of said injection means, accommodated in said hollow piston and said chamber; a means intended for evacuation of said chamber and the cavity of said pressure casting die after pattern material is fed thereinto, said evacuation means being kinematically linked with the hollow piston of said air cylinder; a fluid supply source; a means for feeding fluid to said pressure casting die after evacuation of the latter; a moving element of said fluid feeding means, accommodated in said horizontal channel of said intermediate means; a channel of said fluid feeding means, formed in the moving element thereof and adapted to periodically bring in communication said fluid supply source with the pressure casting die cavity; a means for cleaning said inlet channel of the pressure casting die, incorporating a needle introducible into said inlet channel of the pressure casting die through said horizontal channel of said intermediate means.

2. An apparatus as claimed in claim 1, wherein said means for evacuating said chamber and pressure casting die cavity is formed of an air cylinder having its body affixed on the body of said air cylinder of said injection means, with a rod thereof being permanently in contact with the hollow piston of said air cylinder of said injection means.

3. An apparatus as claimed in claim 1, wherein said means for feeding fluid to said pressure casting die is formed of an air cylinder mounted on the means for cleaning the pressure casting die inlet channel and formed with a hollow open-ended rod, being a moving element of said means, and provided with a nipple fixed on the hollow rod of the air cylinder and communicating with said fluid supply source; accommodated in the rod of the air cylinder of said fluid feeding means is the needle of said ejection means for cleaning the pressure casting die inlet channel.

4. An apparatus as claimed in claim 1, wherein said means for feeding fluid to the pressure casting die is formed with a sleeve and a sliding spool, the former being mounted in said intermediate means perpendicular to its horizontally extending channel; fitted in the sleeve of said fluid feeding means are three openings, of which two are coaxial with the horizontal channel of said intermediate means; a nipple introduced into the third of said openings and brought in communication with said fluid supply source; the sliding spool of said fluid feeding means, accommodated in the sleeve and being the moving element; an actuator connected with the sliding spool and adapted to effect its turning; a T-shaped channel fitted in the sliding spool and adapted to communicate the pressure casting die cavity either with said nipple or with said horizontal channel of said intermediate means as the sliding spool turns.

5. An apparatus as claimed in claim 1, wherein there is provided a vertically mounted branch pipe arranged between said intermediate means and chamber, and constantly communicating with said vertical channel of the intermediate means; a plugged end of said branch pipe, disposed in said chamber; a transverse channel extending across said branch pipe in the proximity of its plugged end, adapted to enable periodic communication with said chamber as it moves.

* * * * *

UNITED STATES PATENT OFFICE
CERTIFICATE OF CORRECTION

Patent No. 4,154,287          Dated    May 15, 1979

Inventor(s)   Yakov Arkadievich Kharagezov, et al.

It is certified that error appears in the above-identified patent and that said Letters Patent are hereby corrected as shown below:

Column 4, line 44: change "Fig. at" to --Fig. 1 at--.

Column 6, line 8: change "lowe" to --lower--.

Signed and Sealed this

Sixth Day of November 1979

[SEAL]

Attest:

RUTH C. MASON
Attesting Officer

LUTRELLE F. PARKER
Acting Commissioner of Patents and Trademarks